United States Patent
Araki et al.

(10) Patent No.: US 7,698,600 B2
(45) Date of Patent: Apr. 13, 2010

(54) PROGRAMMABLE CONTROLLER

(75) Inventors: Tsutomu Araki, Okazaki (JP); Mitsushi Nishi, Okazaki (JP); Manfred Kramer, Giessen-Wieseck (DE)

(73) Assignee: JTEKT Corporation, Osaka-shi (JP)

( * ) Notice: Subject to any disclaimer, the term of this patent is extended or adjusted under 35 U.S.C. 154(b) by 407 days.

(21) Appl. No.: 11/668,242

(22) Filed: Jan. 29, 2007

(65) Prior Publication Data

US 2007/0282457 A1 Dec. 6, 2007

Related U.S. Application Data

(63) Continuation of application No. PCT/JP2005/013889, filed on Jul. 22, 2005.

(30) Foreign Application Priority Data

Jul. 29, 2004 (JP) .......................... P.2004-221736

(51) Int. Cl.
 *G06F 11/00* (2006.01)
(52) U.S. Cl. .......................... 714/43; 714/42
(58) Field of Classification Search .................. 714/43, 714/38, 39, 42, 54
 See application file for complete search history.

(56) References Cited

U.S. PATENT DOCUMENTS

| 3,829,842 | A | * | 8/1974 | Langdon et al. | ............. 700/159 |
| 2002/0093874 | A1 | * | 7/2002 | Ukon | ......................... 365/236 |
| 2004/0199824 | A1 | * | 10/2004 | Harter | .......................... 714/30 |
| 2005/0090926 | A1 | * | 4/2005 | Tanaka et al. | ............... 700/121 |

FOREIGN PATENT DOCUMENTS

| EP | 0 442 651 A | 8/1991 |
| JP | 5-81065 | 4/1993 |
| JP | 5-265663 | 10/1993 |
| JP | 08 087429 | 4/1996 |
| JP | 08-185208 | 7/1996 |
| JP | 11-110309 | 4/1999 |

* cited by examiner

*Primary Examiner*—Dieu-Minh Le
(74) *Attorney, Agent, or Firm*—Oblon, Spivak, McClelland, Maier & Neustadt, L.L.P.

(57) ABSTRACT

A programmable controller having self-diagnosis unit 60 (70) for self-diagnosis, wherein the self-diagnosis unit 60 (70) comprises data storage unit 61 (71) for storing data pertaining to an inspection unit for which the inspection is completed, and inspection start unit 62 (72) for starting the inspection from the next inspection unit of the inspection unit for which the inspection is already completed at the time before the power is turned on, when performing a self-diagnosis that occurs after the power is turned on, based on the data stored in the data storage unit 61 (71).

12 Claims, 5 Drawing Sheets

PROGRAMMABLE CONTROLLER

CROSS REFERENCE TO RELATED APPLICATIONS

This application contains subject matter related to Japanese and International applications JP2004-221736, JP2004-222101, PCT/JP2005/013888 and PCT/JP2005/013889, the entire contents of which being incorporated herein by reference in their entirety. Priority applications PCT/JP2005/013889 and JP2004-221736 were filed on Jul. 22, 2005 and Jul. 29, 2004 respectively.

TECHNICAL FIELD

The present invention relates to a programmable controller, and more particularly to a programmable controller having self-diagnosis unit for self-diagnosing whether or not a RAM is normal by inspecting sequentially a plurality of memory areas to which the address is individually allocated in the sequenced inspection units.

BACKGROUND ART

In a technical field of FA (factory automation), a programmable controller (hereafter referred to as a "PLC") is used to control various kinds of devices. The PLC is applied to various kinds of unitary industrial machines, such as machine tools, automatic assembling machines and automatic welding machines. Herein, the PLC is constituted of a computer having a CPU, a ROM and a RAM. And some PLCs have a self-diagnosis function of performing the self-diagnosis as to whether there is any breakdown inside the PLC to secure enough reliability for the PLC itself to operate normally. The above-mentioned self-diagnosis is performed at an appropriate time after the power is turned on in the PLC. The self-diagnosis performed in preparation before the PLC starts the usual operation immediately after the power is turned on is hereafter referred to as an "initial self-diagnosis", and the self-diagnosis repeatedly performed at appropriate times during the usual operation of the PLC is hereinafter referred to as a "normal self-diagnosis".

The self-diagnosis mainly involves inspecting whether or not the RAM is normal. Generally, as the self-diagnosis, two or more memory areas to which the address is individually allocated are inspected sequentially in the sequence of the address. Referring to FIG. 7, this will be specifically described below.

First of all, the data stored in all the memory areas to be inspected from the first address to the nth address is stored in a stack as the backup. Next, it is checked whether or not the data for inspection is correctly written into the memory area in the first address, and the data of the memory areas in other addresses from the second address to the nth address are unchanged by comparing the data of the memory areas in other addresses with the backed up data. Thereby, it is possible to inspect whether the memory area in the first address is not opened (ruptured), and the memory area in the first address is not shorted (short-circuited) with other memory areas.

Such inspection of the memory area is sequentially performed for each memory area in the second address and beyond in the sequence of the address. Herein, for the inspection of the memory area in the second address and beyond, it is unnecessary to compare the memory area where the inspection is already completed, such as the memory area in the first address, with the backed up data, because it is checked not to be short-circuited with other memory areas. Therefore, the memory area where the inspection is already completed is saved.

All the memory areas to be inspected are repeatedly inspected by n times in total, and upon completing the inspection of the memory area in the last nth address, the inspection of all the memory areas to be inspected is completed, that is, the self-diagnosis of one cycle is ended.

In the conventional PLC, the self-diagnosis of one cycle is performed as an initial self-diagnosis immediately after turning on the power, or as a normal self-diagnosis during the normal operation. Herein, though in the initial self-diagnosis, the self-diagnosis of one cycle is performed continuously through a series of processings, the PLC during the normal operation can not secure a sufficient spare time for performing the self-diagnosis of one cycle continuously through a series of processings, because a process for controlling various devices is always performed. Hence, for the normal self-diagnosis, the self-diagnosis of one cycle is not performed continuously through a series of processings, but subdivided, using the spare time allotted to the self-diagnosis. In the conventional PLC, though it is natural that in the initial self-diagnosis the inspection is started from the memory area in the top address, the inspection is started from the memory area in the top address in the normal self-diagnosis at the first time after the power is turned on.

The above-mentioned background art is the general matter, and the present applicant knows no documents having a description of specifying this background art at the time of application.

DISCLOSURE OF THE INVENTION

In the above self-diagnosis, it takes a long time to finish the self-diagnosis of one cycle, because all the memory areas to be inspected are repeatedly inspected sequentially in the sequence of the address. Hence, the conventional PLC had the following problems, when the initial self-diagnosis and the normal self-diagnosis are noted individually. First of all, noting the initial self-diagnosis, it takes a time of about 15 to 30 seconds to perform the initial self-diagnosis in the conventional PLC, for example. Hence, the conventional PLC had the problem that the start-up after turning on the power is slow, and it cannot be operated at once after turning on the power.

Since the PLC has the normal self-diagnosis, it is simply considered to make the start-up faster by omitting the initial self-diagnosis. However, even though the normal self-diagnosis is performed, this normal self-diagnosis is performed employing the spare time during operation, whereby it takes a long time to finish the self-diagnosis of one cycle. For instance, to finish the normal self-diagnosis of one cycle, it is required to operate the PLC continuously without turning off the power over a long time of about 20 to 30 minutes. Herein, if an event that the power is turned off before" the normal self-diagnosis of one cycle is ended occurs repeatedly due to some factors, the memory area where the inspection is not completed by the normal self-diagnosis will always exist, remarkably decreasing the reliability of the PLC. Therefore, the initial self-diagnosis cannot be omitted.

In particular, when the PLC is adopted as the PLC for fail safe, or a so-called "safety PLC", that controls various kinds of devices to the safety side, such as stopping or operating various kinds of devices of control object to the safety side upon an input signal from an input device for safety such as an emergency stop button, a human body detection sensor, or a detector for detecting the disconnection of signal line, the higher reliability is demanded. In such safety PLC, it is not suitable that the initial self-diagnosis is omitted.

Considering the normal self-diagnosis, if the event that the power is turned off before the normal self-diagnosis of one cycle is ended occurs repeatedly, the memory area where the inspection is not completed by the normal self-diagnosis will always exist. Therefore, the conventional PLC could not ensure enough reliability according to the normal self-diagnosis process.

Also, since it takes a long time to finish the normal self-diagnosis of one cycle, the normal self-diagnosis of one cycle is not always ended, when the operation is stopped by turning off the power of the PLC. Therefore, as the power of the PLC is repeatedly turned on/off over a long time use, the number of inspections for the memory area with the later sequence of inspection is remarkably smaller than the memory area with the earlier sequence of inspection. Hence, the conventional PLC had the problem that there are variations in the inspection frequency between the individual memory areas, and the uniform reliability cannot be achieved.

The present invention has been achieved in the light of the above-mentioned problems, and it is an object of the invention to provide a PLC in which noting the initial self-diagnosis, the time required to perform the initial self-diagnosis is shortened, whereby the start-up after turning on the power is made faster, while noting the normal self-diagnosis, enough reliability is ensured, and uniform reliability is achieved for individual memory areas to be inspected.

In order to accomplish the above object, the present invention provides a programmable controller having self-diagnosis unit for self-diagnosing whether or not a RAM is normal by inspecting sequentially a plurality of memory areas to which the address is individually allocated in the sequenced inspection units, the self-diagnosis unit characterized by comprising a data storage unit for storing data pertaining to an inspection unit for which the inspection is completed, and an inspection start unit for starting the inspection from the next inspection unit of the inspection unit for which the inspection is already completed at the time before the power is turned on, when performing a self-diagnosis that occurs after the power is turned on, based on the data stored in the data storage unit.

Herein, the self-diagnosis performed by the self-diagnosis unit may be the initial self-diagnosis, or the normal self-diagnosis. Also, the data stored in the data storage unit may be the data pertaining to the inspection unit for which the inspection is completed, to enable the inspection start unit to start the inspection from the next inspection unit of the inspection unit for which the inspection is already completed, in other words, the data for specifying the inspection unit to start in the self-diagnosis at the next time. Hence, such data may be the data indicating the inspection unit for which the inspection is completed, the data indicating the next inspection unit of the inspection unit for which the inspection is completed, and the data of appropriate substance, for example.

In the PLC of the above configuration, if the power is turned off and then turned on again, the self-diagnosis starts the inspection from the next inspection unit of the inspection unit for which the inspection is already completed before the power is turned off at the previous time. In other words, the self-diagnosis after the power is turned on is continued from the self-diagnosis before the power is turned off at the previous time. Therefore, in a case where the self-diagnosis is the initial self-diagnosis, the inspection is completed for all the inspection units sequenced from the first inspection unit to the last inspection unit by repeatedly turning on and off the power, whereby it is unnecessary to inspect all the memory areas to be inspected through one initial self-diagnosis. Therefore, the inspection subject through one initial self-diagnosis may be a part of the memory areas. And by doing so, the time required for the initial self-diagnosis is shortened, and the start-up after turning on the power is made faster.

On the other hand, in a case where the self-diagnosis is the normal self-diagnosis, the inspection is continued from the next inspection unit of the inspection unit for which the inspection is completed before the power is turned off at the previous time, every time the power is turned on, even if the power is repeatedly turned off in a short time at the stage before the normal self-diagnosis of one cycle is ended, whereby the inspection for the inspection unit with later sequence is securely performed along with the passage of the total time for which the power is turned on. Hence, this normal self-diagnosis ensures the enough reliability for the PLC. Also, the initial self-diagnosis may be omitted, because the normal self-diagnosis ensures the enough reliability for the PLC. And the start-up of the PLC after the power is turned on is made remarkably faster by omitting the initial self-diagnosis.

Also, the inspection is continued from the next inspection unit of the inspection unit for which the inspection is completed after the power is turned on again, even if the power is turned off at the stage where the normal self-diagnosis of one cycle is not ended, whereby there is no variation in the number of inspections between the inspection unit with earlier sequence and the inspection unit with later sequence. Hence, the uniform reliability for individual memory areas to be inspected is achieved.

In this manner, with the PLC of the above configuration, noting the initial self-diagnosis, the time required for the initial self-diagnosis is shortened, whereby the start-up after turning on the power is made faster. On the other hand, noting the normal self-diagnosis, the enough reliability is securely achieved. And the uniform reliability for individual memory areas to be inspected is achieved.

In the programmable controller of the invention, the self-diagnosis unit may be initial self-diagnosis unit for performing an initial self-diagnosis immediately after the power is turned on, the initial self-diagnosis unit performs the self-diagnosis for one inspection unit every time the power is turned on, where the memory area groups into which all the memory areas to be inspected are subdivided are the inspection units.

In the PLC of the above configuration, in the initial self-diagnosis, since the initial self-diagnosis for one memory area group that is one inspection unit is performed, the time required for the initial self-diagnosis is shorter than inspecting all the memory areas to be inspected. Hence, in the PLC of the above configuration, the start-up after turning on the power is securely made faster.

Also, in one initial self-diagnosis, the self-diagnosis is made for only a part of all the memory areas to be inspected, a plurality of inspection units are sequentially self-diagnosed individually through the initial self-diagnosis <'>, every time the power is repeatedly turned on, whereby all the inspection units are self-diagnosed through the initial self-diagnosis. Hence, there is no inspection unit that is not self-diagnosed, and the reliability is not crippled.

The programmable controller of the invention may further comprise, in addition to the initial self-diagnosis unit, a normal self-diagnosis unit for self-diagnosing whether or not the RAM is normal by inspecting sequentially all the memory areas to be inspected from the first memory area to the last memory area in the sequence in which the address is allocated, while the programmable controller itself is normally operating.

In the PLC of the above configuration, the normal self-diagnosis is performed in addition to the initial self-diagnosis, the reliability is further increased. This normal self-diagnosis may start the inspection from the memory area in the top address at any time, as conventionally, or start the inspection from the memory area in the next address of the memory area for which the inspection is completed at the previous time after the power is turned off and then turned on again.

In the programmable controller of the invention, all the memory areas to be inspected may be divided into two memory area groups.

In the PLC of the above configuration, since the inspection unit is the memory area group in which all the memory areas are divided into two, the execution of the inspection is assured for all the memory areas to be inspected with the initial self-diagnosis when the power is turned on at the first time and the initial self-diagnosis when the power is turned on at the second time. That is, all the memory areas to be inspected are inspected because the power is turned on twice. Hence, even though the power is turned off due to some factors, if the power is thereafter turned on, all the memory areas to be inspected are completely inspected through the initial self-diagnosis after turning on the power, together with the initial self-diagnosis at the previous time, whereby the reliability is precisely secured.

In the programmable controller of the invention, the self-diagnosis unit may be normal self-diagnosis unit for performing the normal self-diagnosis while the programmable controller itself is operating, and the normal self-diagnosis unit may make the self-diagnosis for individual memory areas to which the address is allocated as the inspection units.

In the PLC of the above configuration, the self-diagnosis is performed as the normal self-diagnosis, and the normal self-diagnosis performed after the power is turned on starts the inspection from the memory area in the next address, continued from the memory area for which the inspection is already completed when the power is turned off at the previous time. Therefore, even if the power is repeatedly turned off in a short time at the stage before the normal self-diagnosis of one cycle is ended, the inspection for the inspection unit with later sequence of the address is securely performed along with the total time for which the power is turned on. Hence, this normal self-diagnosis can attain the sufficient reliability of the PLC.

Also, there is no variation in the number of inspections between the memory area with earlier sequence of the address and the memory area with later sequence.

The programmable controller of the invention may further comprise an emergency self-diagnosis unit for inspecting sequentially all the memory areas to be inspected from the first memory area to the last memory area in the sequence in which the address is allocated, immediately after the power is turned on, when the inspection unit to start the inspection can not be specified by the inspection start unit.

The state where the inspection unit to start the inspection can not be specified by the inspection start unit is an abnormal state, such as a state where all are reset to the initial state, state where the data stored in the data storage unit is lost, or state where the inspection start unit can not perform the processing based on this data the data stored in the data storage unit. In such abnormal state, all the memory areas to be inspected are sequentially inspected from the first memory area to the last memory area in the sequence in which the address is allocated in the PLC of the above configuration by the emergency self-diagnosis unit, immediately after the power is turned on.

That is, the initial self-diagnosis is performed for all the memory areas, as conventionally. Hence, the reliability of the PLC is further increased.

BRIEF DESCRIPTION OF THE DRAWING

In the accompanying drawings:

FIGS. 5A and 5B are explanatory diagrams for the normal self-diagnosis, in which FIG. 5A is an explanatory diagram showing a state where a power is turned off, and FIG. 5B is an explanatory diagram showing a state where an inspection is started at the next time after the power is turned on;

BEST MODE FOR CARRYING OUT THE INVENTION

One embodiment of a PLC according to the present invention will be described below in detail with reference to the drawings.

Figure 1:
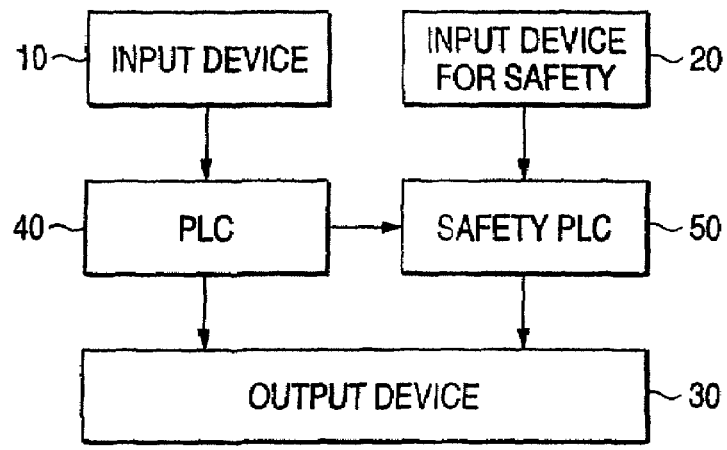
FIG. 1 is a schematic block diagram showing a configuration of an apparatus using a PLC.

FIG. 1 schematically shows a configuration of an apparatus that uses a PLC 40, such as a FA (factory automation), or various industrial machines of simplex such as a machine tool, an automatic assembling machine and an automatic welding machine. In this apparatus, the PLC 40 is connected to an input device 10 such as a limit switch and an output device 30 such as a motor, in which the operation of the output device 30 is controlled by the PLC 40 upon a signal from the input device 10, so that the normal operation of the overall apparatus is controlled.

The apparatus has a safety PLC 50, which is connected to an input device for safety 20 such as an emergency stop button, a human body detection sensor, or a detector for detecting the disconnection of a signal line, and the output device 30. This safety PLC 50 controls the output device 30 to the safety side, such as stopping the operation of the output device 30 by turning off the power of the output device 30, or activating the output device 30 to the side without causing danger, if a signal is inputted from the input device for safety 20, and implements a so-called "fail safe". And the PLC according to the embodiment of the invention is employed as the safety PLC 50. Besides the safety PLC 50, the PLC according to the embodiment of the invention may be employed as the PLC for controlling the normal operation of the output device 30, like the PLC 40.

Figure 2:
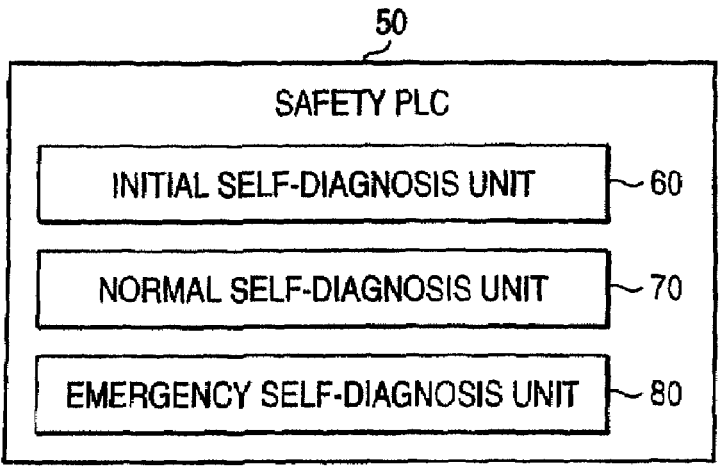
FIG. 2 is a block diagram showing a functional configuration of a safety PLC.

The safety PLC 50 will be described below in detail. The safety PLC 50, like the conventional PLC, is constituted of a computer comprising a CPU, a ROM and a RAM, and has a self-diagnosis function of self-diagnosing whether or not there is any failure in the RAM. Also, the safety PLC 50 of the embodiment performs the self-diagnoses, including an initial self-diagnosis made in preparation before starting the normal operation immediately after turning on the power, a normal self-diagnosis repeatedly performed at appropriate times during the normal operation, and an emergency self-diagnosis made at the emergency time such as when data stored inside is lost or the process based on data is not normally performed. As shown in FIG. 2, the safety PLC 50 has a functional configuration comprising initial self-diagnosis unit 60 for performing the initial self-diagnosis, normal self-diagnosis unit 70 for performing the normal self-diagnosis, and emergency self-diagnosis unit 80 for performing the emergency self-diagnosis.

The normal self-diagnosis performed by the normal self-diagnosis unit 70 and the emergency self-diagnosis performed by the emergency self-diagnosis unit 80 are identical to those of the conventional self-diagnoses, in which the memory areas to be inspected are inspected sequentially from the memory area in the first address to the memory area in the last address in the sequence of the address, supposing that the memory areas to which the address is allocated are individual inspection units, but the initial self-diagnosis unit 60 performs the self-diagnosis differently from the conventional self-diagnosis.

Figure 3:
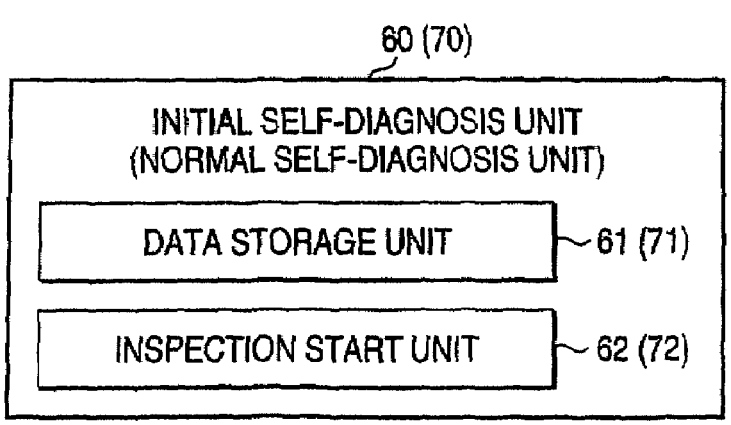
FIG. 3 is a block diagram showing a configuration of initial self-diagnosis unit (normal self-diagnosis unit)

The initial self-diagnosis unit 60 will be described below in detail. The initial self-diagnosis unit 60 performs the initial self-diagnosis for one inspection unit, every time the power is turned on, where the memory area groups into which all the memory areas to be inspected are subdivided are the inspection units. Also, the initial self-diagnosis unit 60 comprises data storage unit 61 and inspection start unit 62, as shown in FIG. 3. Herein, the data storage unit 61 stores the data pertaining to the inspection unit for which the inspection is completed, and the inspection start unit 62 starts the inspection from the next inspection unit of the inspection unit for which the inspection is already-completed at the time before the power is turned on, in other words, the inspection unit for which the inspection is completed by the initial self-diagnosis performed when the power is turned on at the previous time, based on the data stored in the data storage unit 61, in performing the initial self-diagnosis immediately after turning on the power.

Figure 4:
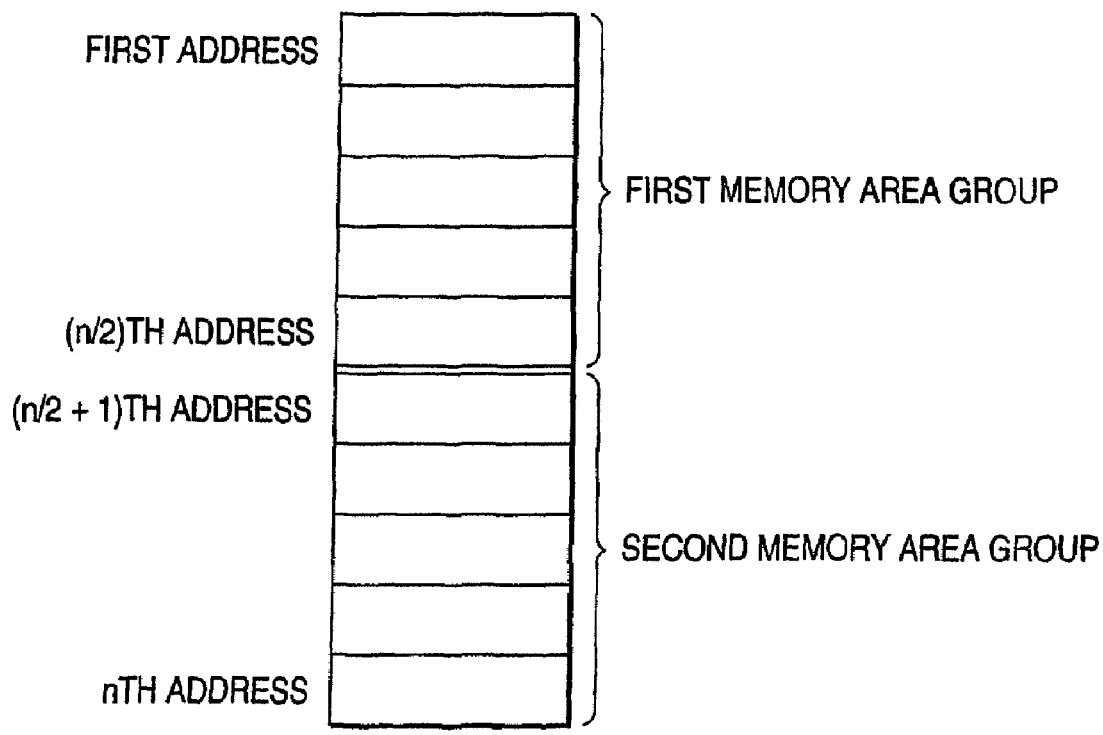
FIG. 4 is an explanatory diagram showing one example of an inspection unit in an initial self-diagnosis.

In the embodiment, all the memory areas to be inspected from the memory area in the first address to the memory area in the nth address are divided into two memory areas of the first memory area group and the second memory area group, as shown in FIG. 4. In particular, the first memory area group is composed of the memory areas from the first address to the n/2th address, and the second memory area group is composed of the memory areas from the (n/2+1)th address to the nth address, in which the first memory area group and the second memory area group are uniformly divided.

Therefore, immediately after the power is turned on, the safety PLC 50 of the embodiment performs the initial self-diagnosis for the next memory area group of the memory area group of one set that is one inspection unit for which the inspection is completed (made) immediately after the power is turned on at the previous time. For example, if the initial self-diagnosis for the first memory area group is made at the previous time when the power is turned on, the initial self-diagnosis is performed for the second memory area group at the next time when the power is turned on. Herein, in performing the initial self-diagnosis for the memory area group of one set, the memory areas to which the address is allocated are inspected sequentially in the sequence of the address by the almost same method as conventionally performed.

Although all the memory areas are divided into two in the embodiment, the memory areas may be divided into three or more. In this case, it is preferable that the memory areas are divided so that the memory area groups may be even. Because the time required to make the initial self-diagnosis every time of turning on the power can be constant.

Although in the embodiment the normal self-diagnosis of one cycle is repeatedly performed by the normal self-diagnosis unit 70 during the normal operation, as conventionally performed, this normal self-diagnosis unit 70 may perform the normal self-diagnosis by inspecting sequentially the memory areas to be inspected in the sequence of the address, where the memory areas to which the address is allocated are the inspection units, in which the normal self-diagnosis unit 70 may comprise data storage unit 71 for storing data pertaining to the inspection unit for which the inspection is completed, and inspection start unit 72 for starting the inspection from the next inspection unit of the inspection unit for which the inspection is already completed at the time before turning on the power, in performing the self-diagnosis made after turning on the power, based on the data stored in the data storage unit 71, as shown in parentheses in FIG. 3.

Figure 5A:
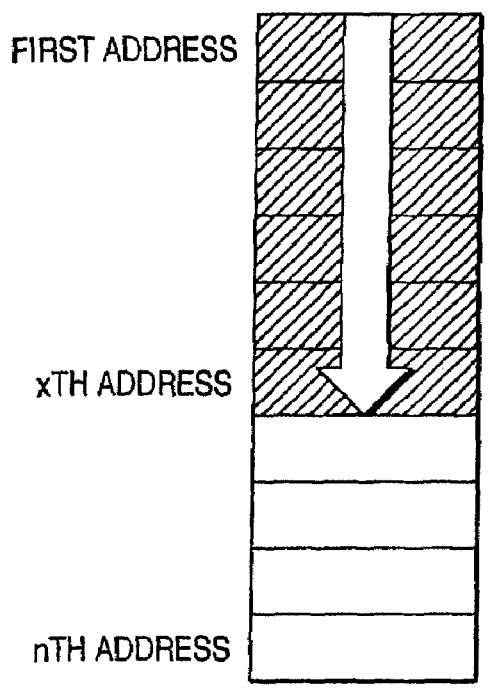
Figure 5B:
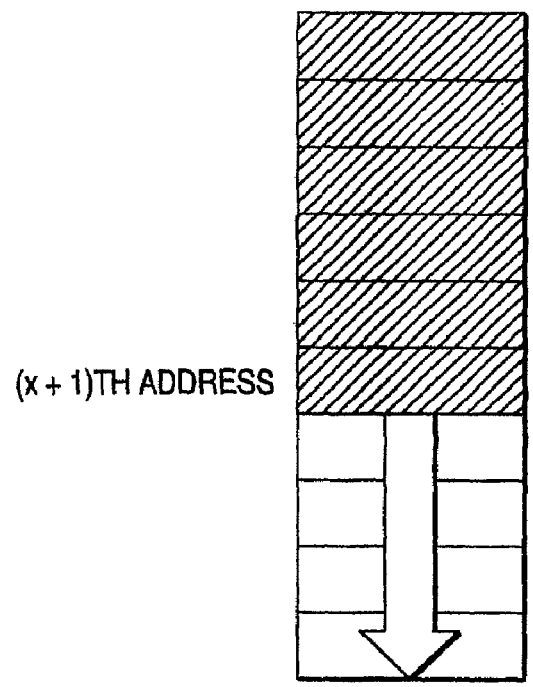

In this manner, even if the power is turned off, before the inspection for all the memory areas to be inspected is completed, in other words, the normal self-diagnosis of one cycle is completed, it is possible to start the inspection from the memory area in the next address of the memory area <⋅> for which the inspection is already completed, without duplicately inspecting the memory area for which the inspection is already completed before turning off the power at the previous time, in performing the first normal self-diagnosis during the normal operation after turning on the power on at the next time. For example, in the case where the memory areas from the first address to the nth address are inspected, even if the power is turned off when the inspection is completed from the memory area in the first address to the memory area in the xth address (see the oblique line part in the figure shown in FIG. 5A), it is possible to start the inspection from the memory area in (x+1)th address in the first normal self-diagnosis performed after turning on the power at the next time, as shown in FIG. 5B.

When the inspection unit to start the inspection by the inspection start unit 62, 72 can not be specified in a state where the data stored in the data storage unit 61, 71 is lost, or a state where the self-diagnosis is not started from the next inspection unit by the inspection start unit 62, 72 even if the data is stored, there is possibility that the safety PLC 50 is abnormal. Thus, in such a case, all the memory areas to be inspected are sequentially inspected from the first memory area to the last memory area in the sequence in which the address is allocated by the emergency self-diagnosis unit 80, immediately after the power is turned on. That is, the emergency self-diagnosis having the same substance as the conventional initial self-diagnosis is performed. Thereby, when there is a failure inside the safety PLC 50, the failure is detected, preventing nonconformity that the normal operation is started with the possibility of the abnormal condition.

Figure 6:
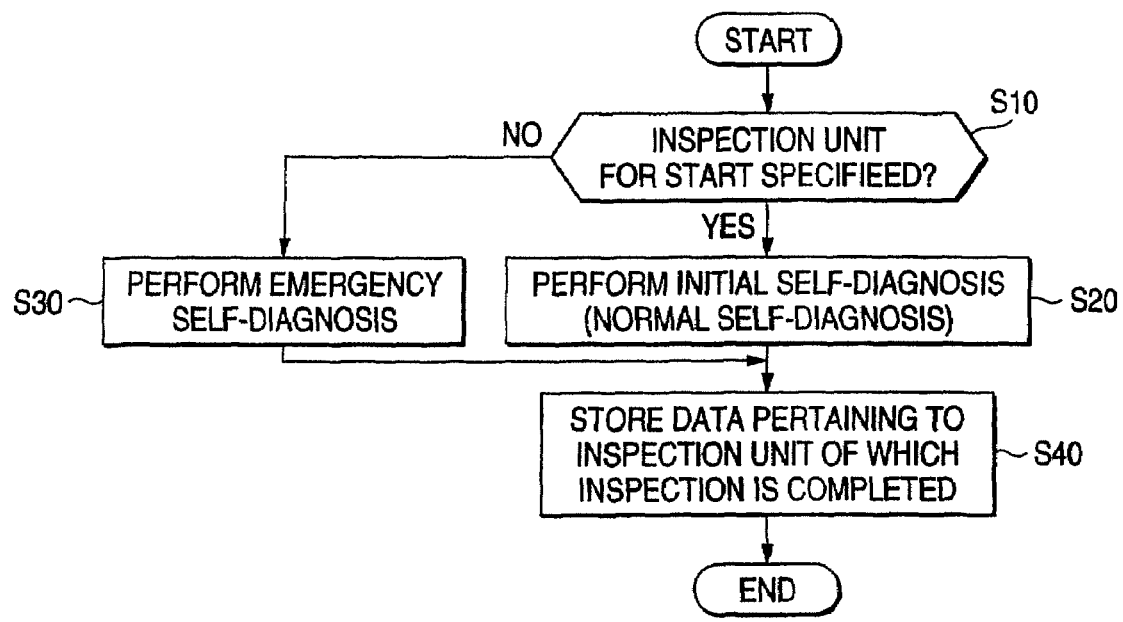
FIG. 6 is a flowchart showing a self-diagnosis process that is performed in the safety PLC.
Figure 7:
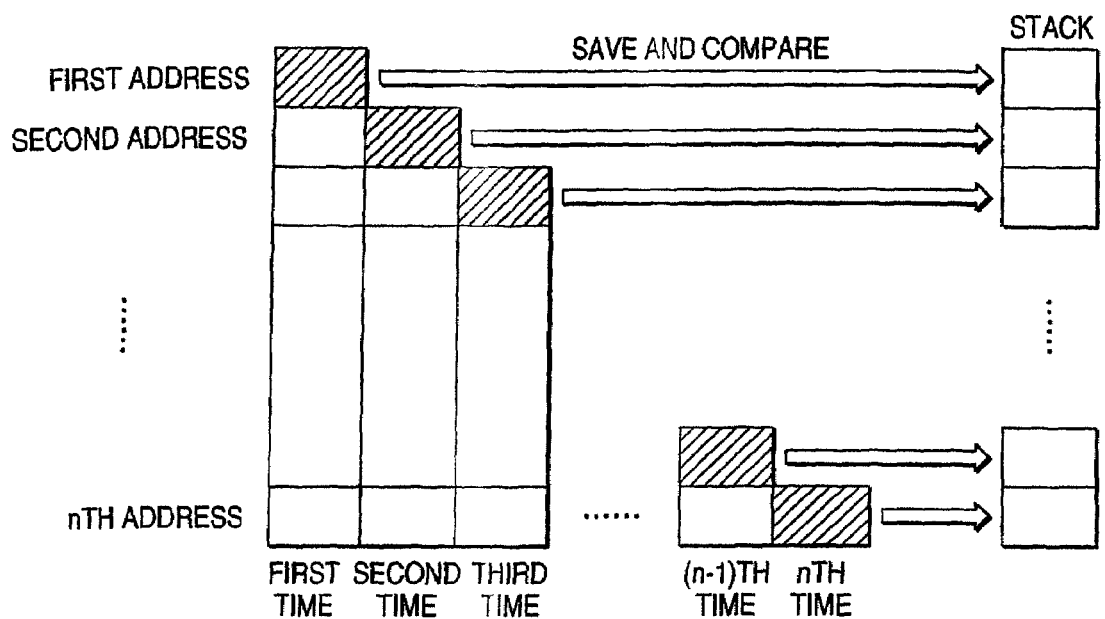
FIG. 7 is an explanatory diagram showing a state where the memory area is inspected.

Referring to a flowchart of FIG. 6, a self-diagnosis processing procedure performed in the safety PLC of the embodiment will be described below. In the following, the procedure for performing the initial self-diagnosis will be described, but the procedure for the normal self-diagnosis is shown in parentheses, and its explanation is omitted.

First of all, immediately after turning on the power (at the timing of performing the first normal self-diagnosis during operation), it is determined at step S10 whether or not the inspection unit to start can be specified. Herein, the inspection unit is the memory area group (memory area), and if the inspection unit to start can be specified by the inspection start unit 62 (72), based on the data stored in the data storage unit 61 (71), that is, if the answer is "YES" at step S1O, the procedure goes to step S20 to perform the initial self-diagnosis (normal self-diagnosis process) to start the inspection from this inspection unit. Thereafter, the procedure goes to step S40.

On the other hand, if it is determined that the inspection unit can not be specified, that is, if the answer is "NO" at step S10, the procedure goes to step S30 to perform the emergency self-diagnosis. Thereafter, the procedure goes to step S40.

At step S40, the data pertaining to the inspection unit for which the inspection is completed is stored in the data storage unit 61 (71), and the procedure is ended. Herein, the data storage unit 61 (71) may store the data itself indicating the inspection unit for which the inspection is completed, or the data indicating the inspection unit to start the inspection at the next time. Also, the data stored after the emergency self-diagnosis is performed is the data pertaining to the inspection unit to which the memory area in the last address belongs.

The timing of storing the data in the data storage unit 71 in the normal self-diagnosis may occur every time the inspection for individual inspection units is completed. However, in this case, since a process for storing the data is needed every time the inspection is completed, it takes a longer time to perform the normal self-diagnosis of one cycle while the safety PLC 50 is operating. Hence, power interruption detecting means for detecting that the power is turned off is provided separately, and after it is detected that the power is turned off by this power interruption detecting means, the data pertaining to the inspection unit for which the inspection is already completed is preferably stored, employing a back-up power source.

INDUSTRIAL APPLICABILITY

As described above, with the invention, noting the initial self-diagnosis, the time required for the initial self-diagnosis is shortened, whereby it is possible to provide the PLC in which the start-up after turning on the power is made faster. On the other hand, noting the normal self-diagnosis, the enough reliability is securely achieved, whereby it is possible to provide the PLC in which the uniform reliability for individual memory areas to be inspected is achieved.

The invention claimed is:

1. A programmable controller comprising:
   a storage device that has a plurality of memory areas being allocated with individual addresses;
   and a self-diagnosis unit that performs self-diagnosing whether or not the storage device is normal by sequentially inspecting the plurality of memory areas by inspection units of a plurality of inspection units, said plurality of inspection units being within said plurality of memory areas,
   wherein the self-diagnosis unit includes:
   a data storage unit that stores data pertaining to an inspection unit for which inspection is completed; and
   an inspection start unit that starts the inspection from a next inspection unit relative to the inspection unit for which the inspection is already completed at a time before a power is turned on, when performing a self-diagnosis after the power is turned on, based on the data stored in the data storage unit.

2. The programmable controller according to claim 1, wherein the self-diagnosis unit is an initial self-diagnosis unit that performs an initial self-diagnosis immediately after the power is turned on, and
   wherein the initial self-diagnosis unit performs the self-diagnosis for one of the inspection units every time the power is turned on, where a memory area groups into which all of the memory areas to be inspected are subdivided are the inspection units.

3. The programmable controller according to claim 2 further comprising a normal self-diagnosis unit that performs self-diagnosing whether or not the storage device is normal by sequentially inspecting all of the memory areas to be inspected from the first memory area to the last memory area in order of the allocated address, while the programmable controller is normally operating.

4. The programmable controller according to claim 3, wherein all the memory areas to be inspected are divided into two memory area groups.

5. The programmable controller of claim 4, further comprising:
   an emergency self-diagnosis unit that sequentially inspects all of the memory areas to be inspected from a first memory area to a last memory area in order of a allocated address, immediately after power is turned on, when the inspection unit to start the inspection cannot be specified by the inspection start unit.

6. The programmable controller of claim 3, further comprising:
   an emergency self-diagnosis unit that sequentially inspects all of the memory areas to be inspected from a first memory area to a last memory area in order of a allocated address, immediately after power is turned on, when the inspection unit to start the inspection cannot be specified by the inspection start unit.

7. The programmable controller according to claim 2, wherein all the memory areas to be inspected are divided into two memory area groups.

8. The programmable controller of claim 7, further comprising:
   an emergency self-diagnosis unit that sequentially inspects all of the memory areas to be inspected from a first memory area to a last memory area in order of a allocated address, immediately after power is turned on, when the inspection unit to start the inspection cannot be specified by the inspection start unit.

9. The programmable controller of claim 2, further comprising:
   an emergency self-diagnosis unit that sequentially inspects all of the memory areas to be inspected from a first memory area to a last memory area in order of a allocated address, immediately after power is turned on, when the inspection unit to start the inspection cannot be specified by the inspection start unit.

10. The programmable controller according to claim 1, wherein the self-diagnosis unit is normal self-diagnosis unit that performs the self-diagnosis while the programmable controller is normally operating, and
    wherein the normal self-diagnosis unit performs the self-diagnosis for individual memory areas as the inspection units.

11. The programmable controller of claim 10, further comprising:
    an emergency self-diagnosis unit that sequentially inspects all of the memory areas to be inspected from a first memory area to a last memory area in order of a allocated address, immediately after power is turned on, when the inspection unit to start the inspection cannot be specified by the inspection start unit.

12. The programmable controller according to claim 1 further comprising:
    an emergency self-diagnosis unit that sequentially inspects all of the memory areas to be inspected from a first memory area to a last memory area in order of a allocated address, immediately after power is turned on, when the inspection unit to start the inspection cannot be specified by the inspection start unit.

* * * * *